United States Patent
Damerow et al.

(10) Patent No.: US 11,443,530 B2
(45) Date of Patent: Sep. 13, 2022

(54) METHOD FOR LANE AND ROADWAY DETECTION

(71) Applicant: Conti Temic microelectronic GmbH, Nuremberg (DE)

(72) Inventors: Florian Damerow, Uelversheim (DE); Andreea Mirela Fischer, Frankfurt (DE); Christopher Linsenmann, Sigmarszell (DE); Kai Ide, Nonnenhorn (DE); Matthias Limmer, Ulm (DE); Stefan Hegemann, Wangen (DE)

(73) Assignee: CONTI TEMIC MICROELECTRONIC GMBH, Nuremberg (DE)

( * ) Notice: Subject to any disclaimer, the term of this patent is extended or adjusted under 35 U.S.C. 154(b) by 0 days.

(21) Appl. No.: 17/053,882

(22) PCT Filed: May 6, 2019

(86) PCT No.: PCT/DE2019/200036
§ 371 (c)(1),
(2) Date: Nov. 9, 2020

(87) PCT Pub. No.: WO2019/214784
PCT Pub. Date: Nov. 14, 2019

(65) Prior Publication Data
US 2021/0232832 A1    Jul. 29, 2021

(30) Foreign Application Priority Data
May 9, 2018  (DE) .................. 10 2018 207 313.9
Aug. 7, 2018  (DE) .................. 10 2018 213 191.0

(51) Int. Cl.
*G06K 9/00* (2022.01)
*G06V 20/56* (2022.01)
(Continued)

(52) U.S. Cl.
CPC ............ *G06V 20/588* (2022.01); *G06N 3/04* (2013.01); *G06N 3/08* (2013.01); *G06T 7/12* (2017.01)

(58) Field of Classification Search
CPC ............... G06N 3/04; G06N 3/08; G06T 7/12
See application file for complete search history.

(56) References Cited

U.S. PATENT DOCUMENTS

| 2019/0065867 A1* | 2/2019 | Huang | ............... G06K 9/00805 |
| 2019/0095722 A1* | 3/2019 | Kang | ...................... G06T 7/215 |

(Continued)

OTHER PUBLICATIONS

Towards End-to-End Lane Detection: an Instance Segmentation Approach Davy Neven Bert De Brabandere Stamatios Georgoulis Marc Proesmans Luc Van Gool ESAT-PSI, KU Leuven, Feb. 15, 2018. (Year: 2018).*

(Continued)

*Primary Examiner* — Dhaval V Patel
(74) *Attorney, Agent, or Firm* — RatnerPrestia

(57) ABSTRACT

A method for lane and roadway detection uses a multitask DNN architecture including an encoder, a first decoder and a second decoder. The method includes the following steps:
providing an input image by an optical detection device,
filtering the input image by the encoder,
generating a first representation of the lane and/or roadway by the encoder,
processing the first representation in the first and second decoders,
outputting two different representations from the first and second decoders,
combining the two different representations, and
outputting identified lanes, lane markings and the roadway.

9 Claims, 3 Drawing Sheets

(51) Int. Cl.
*G06T 7/12* (2017.01)
*G06N 3/04* (2006.01)
*G06N 3/08* (2006.01)

(56) References Cited

U.S. PATENT DOCUMENTS

2019/0102631 A1* 4/2019 Li .................... G06K 9/6263
2019/0163989 A1* 5/2019 Guo .................. G08G 1/167

OTHER PUBLICATIONS

English translation of the International Search Report of the International Searching Authority for International Application PCT/DE2019/200036, dated Jul. 22, 2019, 2 pages, European Patent Office, HV Rijswijk, Netherlands.

PCT International Preliminary Report on Patentability including English Translation of PCT Written Opinion of the International Searching Authority for International Application PCT/DE2019/200036, dated Nov. 10, 2020, 7 pages, International Bureau of WIPO, Geneva, Switzerland.

German Search Report and Office Action for German Patent Application No. 10 2018 213 191.0, dated May 8, 2019, 10 pages, German Patent and Trademark Office, Muenchen, Germany, with English partial translation, 7 pages.

Marvin Teichmann et al., "MultiNet: Real-time Joint Semantic Reasoning for Autonomous Driving", May 8, 2018, arXiv:1612.07695v2 [cs.CV], Retrieved from the Internet: https://arxiv.org/pdf/1612.07695.pdf, retrieved on Jul. 11, 2019, XP055604573, pp. 1 to 10.

Davy Neven et al. , "Towards End-to-End Lane Detection: an Instance Segmentation Approach", 2018 IEEE Intelligent Vehicles Symposium (IV), Jun. 26-30, 2018, https://ieeexplore.ieee.org/ie17/8472796/8500355/08500547.pdf, retrieved on May 7, 2019, XP081215638, pp. 286 to 291.

Yecheng Lyu et al., "Road Segmentation Using CNN with GRU", arXiv:1804.05164v1 [cs.CV], Apr. 14, 2018, XP080870760, 6 pages.

Jaehoon Cho et al., "Multi-Task Self-Supervised Visual Representation Learning for Monocular Road Segmentation", 2018 IEEE International Conference on Multimedia and Expo (ICME), Jul. 23-27, 2018, https://ieeexplore.ieee.org/ie17/8472825/8486434/08486472.pdf, retrieved on May 7, 2019, pp. 1 to 6.

* cited by examiner

METHOD FOR LANE AND ROADWAY DETECTION

FIELD OF THE INVENTION

The invention relates to a method for detecting lanes and roadways.

BACKGROUND INFORMATION

Methods which identify lane markings or roadway boundaries and which are oriented towards this are, for example, known from the prior art. In the known methods, all of the driver assistance functions are also aligned to the lane markings and/or lane boundaries.

The disadvantage of the known methods is that these exclusively utilize the markings and/or boundaries as a reference for the course of the lane or respectively roadway, wherein this frequently leads to problems when markings are missing or are not visible. A lane departure warning system, for example, cannot be operated without correctly identified marking.

Furthermore, certain methods such as, for example, semantic segmentation and also the regression approach are known from the prior art.

Semantic segmentation, that is to say pixelwise classification, is an approach which is often used and which has a high classification performance. However, it is not always easily or clearly possible to extract the relevant information, namely of the lane/road boundary, even from correctly classified image regions, since such systems commonly depict visible regions, e.g. a road, but not the boundaries thereof, for instance the edge of the road.

Especially in those cases where dynamic objects such as vehicles are present, which are concealing lane or road boundaries, the latter are omitted, which makes the downstream extraction of the boundary from the pixel-labeled image material significantly more difficult.

The use of regression approaches offers the possibility of outputting boundaries directly in a parametric representation. In the case of a concealed or uncertain boundary, such an approach is able to interpolate intermediate values from the image context.

In this case, it is however problematic to identify in which regions the network is supplying a correct detection, and in which regions interpolation has been carried out by the network.

SUMMARY OF THE INVENTION

It is accordingly an object of the present invention to provide a method for lane and roadway detection, which makes it possible to securely detect lanes and roadways even in difficult scenarios.

This object can be achieved by a method according to the invention as set forth herein.

Initial considerations concerned the use of a deep neural network (DNN) for securely detecting the lane, the own lane and also neighboring lanes and the drivable road region, said deep neural network making possible a high identification rate, even in difficult scenarios. This also includes the estimation of the detection confidence.

According to the invention, a method for lane detection and roadway detection is proposed, wherein a multitask DNN architecture is used for detection and consists of at least one encoder and at least one first and one second decoder, the method comprising the following steps:

providing an input image by means of an optical detection device,
filtering the input image by means of the encoder,
generating a first representation by the encoder,
forwarding the first representation to the first and the second decoder,
processing the first representation in the first and the second decoder,
outputting two further different representations of the first and second decoder,
combining the two representations of the first and the second decoder,
outputting identified lanes and lane markings and/or the roadway.

The encoder is preferably a convolutional neural network (CNN). The first and the second decoder can likewise be a CNN. The input image can be an image in the RGB or YUV format or a gray image. The identified lanes or the identified roadway and the respective associated boundaries can, for example, be output to a driver assistance system such as a lane departure warning system. The use of the output data for autonomous vehicle operation would also be conceivable.

In a preferred embodiment, the representation of the encoder supplies learned features in the form of convolution filters. Said convolution filters are in particular relevant for detecting lanes. The convolution filters make edge detection possible.

In a particularly preferred embodiment, the first decoder performs a semantic segmentation and the second decoder performs a keypoint regression. A free area of the lane and/or roadway is determined by means of the semantic segmentation. An additional keypoint regression detects the clearly visible boundaries of the lane and/or roadway directly and makes it possible to interpolate uncertain or concealed boundaries.

The representation of the first decoder preferably supplies a pixel-precise classification of the input image of a drivable region. The drivable region is preferably a roadway and/or lane. Consequently, it is possible to classify the lane into various classes such as ego-lane, left adjacent lane, right adjacent lane, second left adjacent lane, etc. and also to classify the entire drivable roadway. A binary image having the classification result is currently output for this output for each class.

In a preferred configuration, the representation of the second decoder supplies visible boundaries of the lane and/or of the roadway as continual pairs of values in image coordinates. The lane and/or roadway boundaries are accordingly output by means of so-called keypoints $(x_i, y_i)$ of the number k, wherein $1<=i<=k$, as continual pairs of values in image coordinates. In this case, a subpixel-precise output is obtained since the CNN of the second decoder provides, in contrast to the CNN of the first decoder, a continual output in the form of floating-point values.

In this case, the k keypoints, which each comprise two values for the x and y position in the image, are divided into an approximation of the left and right roadway boundary, for each side, that is to say k/2 keypoints.

In this case, the keypoints are indicated as 2D image coordinates. Admittedly, the approach can also be converted to 3D world coordinates.

Two different representations of the lanes and/or roadway are accordingly provided as a result of the entire DNN.

An identification confidence for the respective lane and/or roadway boundary is preferably assessed on the basis of the different representations of the first and the second decoder.

On the basis of these two different representations, the DNN intrinsically supplies a certain measure of redundancy. Said redundancy can be used to assess the identification confidence of the DNN for the respective lane boundary.

The more precisely that the respective lane/road boundary (supplied by the keypoint output of the second decoder) reproduces the marginal region of the pixelwise classification of the first decoder of the lane/road, the more secure the output of the DNN is and the higher the identification confidence is, and any downstream function such as, for instance, a tracking control system can react accordingly thereto.

The fact that the joint encoder has two separate decoders for different representations of the lane and/or roadway makes it possible for features to be learned in the encoder during the training, which are advantageous for both representations.

Consequently, the representations support each other during the discovery of these features and, additionally, allow an increased generalizability of the proposed DNN, since the discovered features have to deliver two different representations.

BRIEF DESCRIPTION OF THE DRAWINGS

Further advantageous configurations and embodiments are set out in the figures, wherein.

DETAILED DESCRIPTION OF EXAMPLE EMBODIMENTS OF THE INVENTION

Figure 1:
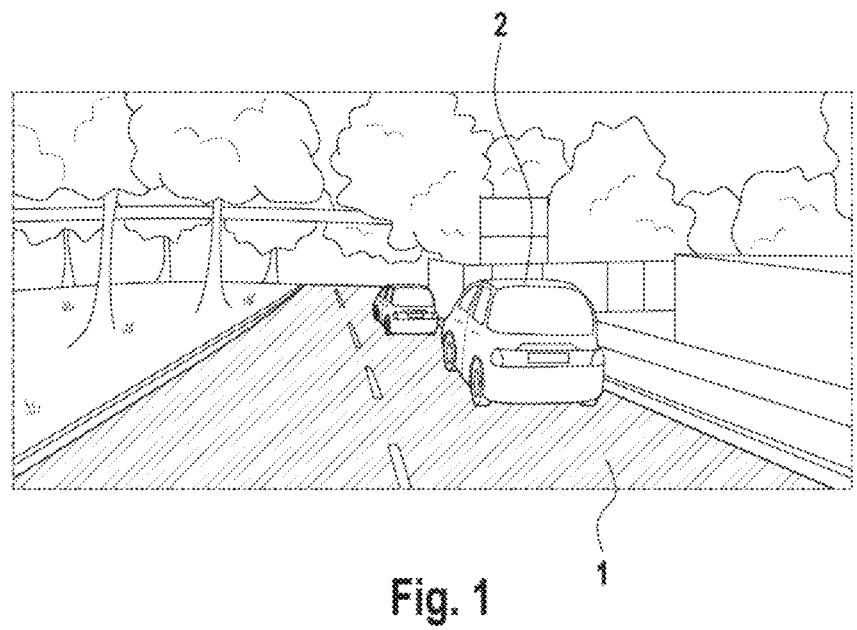
FIG. 1 shows an exemplary representation of a roadway identified by semantic segmentation.

FIG. 1 shows an exemplary representation of a roadway 1 identified by semantic segmentation. In this case, it can be clearly seen that the roadway boundaries are not explicitly identified, but merely the area between the boundaries. Especially in those cases where dynamic objects 2 such as, for example, vehicles are present, which are concealing lane or roadway boundaries, the latter are omitted, which makes the downstream extraction of the boundary from the pixel-labeled image material significantly more difficult. The right edge of the road in FIG. 1 cannot be clearly extracted from pixelwise segmentation.

Figure 2:
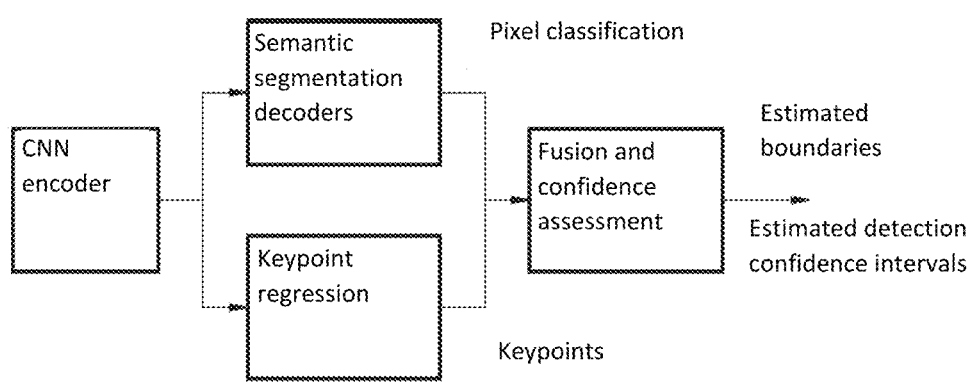
FIG. 2 shows a schematic exemplary representation of an embodiment of the invention.

FIG. 2 shows a schematic exemplary representation of an embodiment of the invention. In this case, an exemplary multitask DNN architecture is shown, which consists of a CNN encoder, a semantic segmentation decoder and a decoder for keypoint regression. The semantic segmentation decoder supplies a pixel classification as the output, and the keypoint regression supplies keypoints as the output. These two outputs are fused with one another and a confidence assessment is performed. By combining the two representations it is possible to estimate in which regions the output of the network is secure, and in which regions interpolation has been carried out and/or there is uncertainty in the detection.

Figure 3:
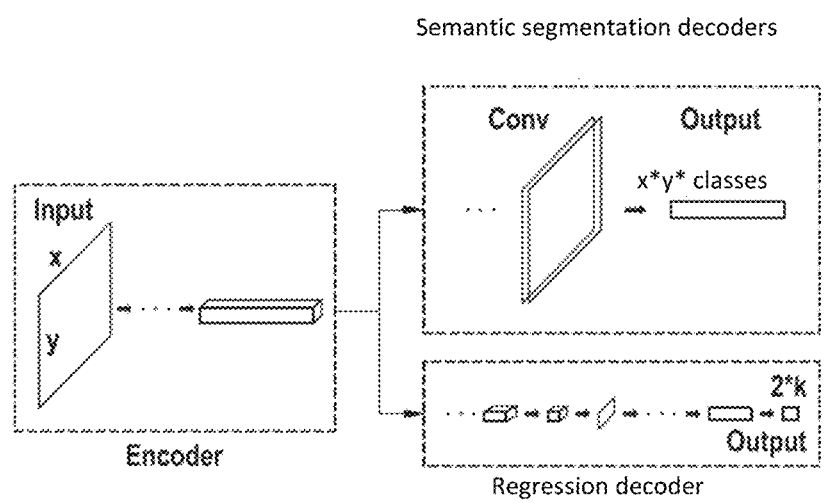
FIG. 3 shows a further schematic exemplary representation of a further embodiment of the invention.

FIG. 3 shows a further schematic exemplary representation of a further embodiment of the invention. Here, a generic construction of a deep neural network, DNN, is shown, which can be used for a secure detection of a lane and neighboring lanes and also lane and/or roadway boundaries. The component parts correspond to the construction from FIG. 2.

Figure 4:
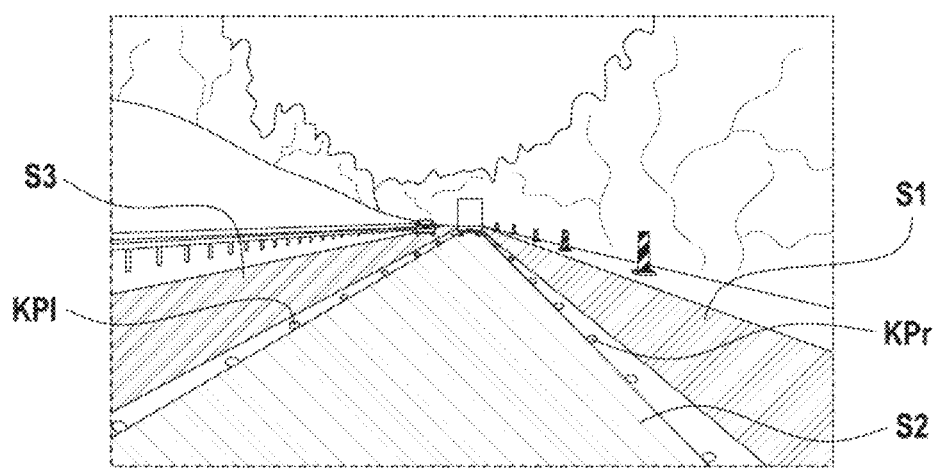
FIG. 4 shows a representation of a roadway having lanes identified according to an embodiment of the invention.

FIG. 4 shows a representation of a roadway 1 having lanes S1-S3 identified according to an embodiment of the invention. In this case, the roadway 1 has been divided into an ego-lane S2, a left adjacent lane S3 and a right adjacent lane S1 by pixelwise classification. Furthermore, the keypoints KP1, KPr supplied from the keypoint regression decoder are shown for the left and right lane marking of the ego-lane S2, which keypoints have been combined into a line and thus represent the lane marking. The reference numeral KP1 describes the keypoints located on the left in the direction of travel and the reference numeral KPr describes the keypoints located on the right in the direction of travel.

Figure 5:
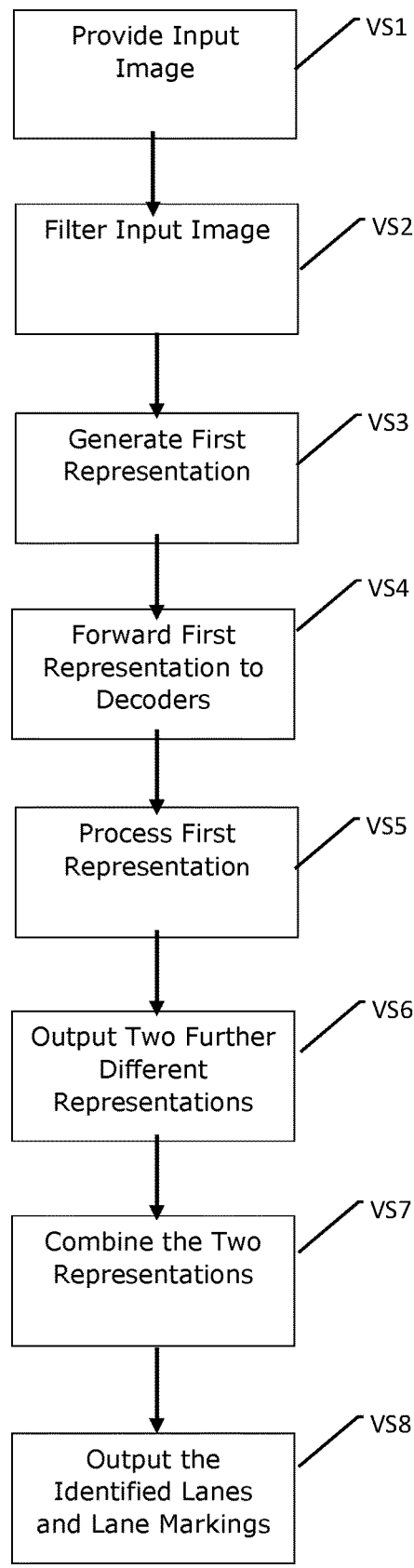
FIG. 5 shows a schematic flow chart of a method according to the invention.

FIG. 5 shows a schematic flow chart of a method according to the invention. In method step VS1, an input image is provided by means of an optical detection device. Said input image is filtered in a subsequent method step VS2 by means of the encoder. In a further step VS3, a first representation of the lane and/or roadway is generated by the encoder. In step VS4, the first representation is forwarded to the first and the second decoder. Said first representation is processed, in step VS5, in the first and the second decoder.

In step VS6, two further different representations of the first and second decoder are output. In step VS7, the two representations of the first and the second decoder are combined. In a final step VS8, the identified lanes and lane markings and also the roadway are output.

LIST OF REFERENCE NUMERALS

1 Roadway
2 Object
S1-S3 Lanes
KP1 Keypoints on the left
KPr Keypoints on the right
VS1-VS8 Method steps

The invention claimed is:

1. A method using a multitask DNN architecture that includes an encoder, a first decoder and a second decoder, wherein the method comprises:
   providing an image of a roadway by an optical detection device;
   filtering the image by the encoder to produce an encoder output;
   providing the encoder output to the first decoder and the second decoder;
   in the first decoder, performing a semantic segmentation on the encoder output to produce a pixel classification of the image;
   in the second decoder, performing a keypoint regression on the encoder output to produce keypoints of the image;
   combining the pixel classification and the keypoints by fusion thereof to produce fused data;
   processing the fused data to detect the roadway, lane markings on the roadway, and a lane of the roadway bounded by the lane markings; and
   outputting roadway data identifying the roadway, the lane markings and the lanes.

2. The method according to claim 1, further comprising operating a driver assistance system of a vehicle in response to and dependent on the roadway data.

3. The method according to claim 1, wherein the encoder output supplies learned features as convolution filters.

4. The method according to claim 1, wherein the pixel classification produced by the first decoder supplies a pixel-precise classification of a drivable region within the image.

5. The method according to claim 4, wherein the drivable region is the roadway and/or the lane of the roadway.

6. The method according to claim 1, wherein the keypoints produced by the second decoder supply visible boundaries of the lane and/or of the roadway as continual pairs of values in image coordinates.

7. The method according to claim 1, further comprising assessing an identification confidence for the lane and/or for the roadway based on the pixel classification produced by the first decoder and the keypoints produced by the second decoder.

8. The method according to claim 1, wherein the pixel classification produced by the first decoder defines a free area of the lane or of the roadway, and the keypoints produced by the second decoder define visible portions of boundaries of the lane or of the roadway.

9. The method according to claim 8, further comprising interpolating concealed portions of the boundaries based on the keypoints.

\* \* \* \* \*